United States Patent [19]
Nakajima et al.

[11] Patent Number: 5,738,343
[45] Date of Patent: Apr. 14, 1998

[54] VIBRATION ISOLATING APPARATUS

[75] Inventors: Zenji Nakajima, Aichi; Yoichi Shimahara, Osaka, both of Japan

[73] Assignees: Toyo Tire & Rubber Co., Ltd., Osaka; Toyota Jidosha Kabushiki Kaisha, Aichi, both of Japan

[21] Appl. No.: 884,313

[22] Filed: Jun. 27, 1997

Related U.S. Application Data

[63] Continuation of Ser. No. 653,802, May 28, 1996, abandoned, which is a continuation of Ser. No. 406,812, Mar. 17, 1995, abandoned, which is a continuation of Ser. No. 78,489, Jun. 16, 1993, abandoned, which is a continuation of Ser. No. 677,541, Mar. 29, 1991, abandoned.

[30] Foreign Application Priority Data

Apr. 3, 1990 [JP] Japan ................................ 2-89576

[51] Int. Cl.$^6$ ................................................ B60G 13/00
[52] U.S. Cl. ................................... 267/219; 267/140.14
[58] Field of Search .......................... 267/140.11, 140.13, 267/140.14, 140.15, 140.3, 141, 141.2, 220, 35, 153, 219; 188/322.11; 248/550, 636

[56] References Cited

U.S. PATENT DOCUMENTS

| | | |
|---|---|---|
| 3,953,010 | 4/1976 | de Vos ................................ 267/220 |
| 4,600,863 | 7/1986 | Chaplin et al. ............... 267/140.1 X |
| 4,643,385 | 2/1987 | Sandercock ........................... 248/550 |
| 4,671,227 | 6/1987 | Hollerweger et al. ....... 267/140.1 X |
| 4,693,455 | 9/1987 | Andra .............................. 248/562 X |
| 4,883,248 | 11/1989 | Uchino et al. ...................... 248/550 |

FOREIGN PATENT DOCUMENTS

| | | | |
|---|---|---|---|
| 59-23139 | 2/1984 | Japan . | |
| 59-23140 | 2/1984 | Japan . | |
| 63-53617 | 3/1988 | Japan . | |
| 92851 | 4/1988 | Japan ................ | 248/562 |
| 63-261300 | 10/1988 | Japan . | |

*Primary Examiner*—Lee W. Young
*Attorney, Agent, or Firm*—Jordan and Hamburg

[57] ABSTRACT

The vibration isolation device of this invention is to be interposed between a vibrating body and a vibrated body, characterized in that at least one of the vibrating body and the vibrated body is fastened to the surface of a vibration isolating device which is abutted against it through a piezoelectric insert interposed constant [K] which is represented by a particular formula or a fastener which is capable of piezoelectric displacement.

10 Claims, 12 Drawing Sheets

VIBRATING BODY SIDE

VIBRATED BODY SIDE

VIBRATION ISOLATING APPARATUS

This application is a continuation of application Ser. No. 08/653,802, filed May 28, 1996, now abandoned, which is a continuation of application Ser. No. 08/406,812, filed Mar. 17, 1995, now abandoned, which is a continuation of application Ser. No. 08/078,489, filed Jun. 16, 1993, now abandoned, which is a continuation of application Ser. No. 07/677,541, filed Mar. 29, 1991, now abandoned.

BACKGROUND OF THE INVENTION

1. Technical Field

The present invention relates to a vibration isolating apparatus to be interposed between a vibrating body and a vibrated body for preventing transmission of vibrations and more particularly to improvements in the mounting arrangement for an interposed piezoelectric insert in a vibration isolating apparatus having said piezoelectric insert.

2. Prior Art

Japanese Kokai Patent Publication No. 63-53617 and No. 63-261300 describe the technology of using an intervening piezoelectric insert of piezoelectric actuator in a predetermined position of a damping device disposed between two bodies constituting a vibrating system and controlling the interposed piezoelectric insert according to the data detected by an acceleration sensor and a load sensor.

However, in the above publications describing such vibration isolating technology, nothing is disclosed about the manner in which such an interposed piezoelectric insert or a piezoelectric actuator, is securely mounted.

When the vibration isolating apparatus for a car engine is to be installed via such an intervening piezoelectric insert, it is necessary to fasten the piezoelectric insert securely in position for reliability reasons. With the usual fastening means, the interposed piezoelectric insert cannot be expected to function properly. There is a method, as illustrated in FIG. 12A, wherein an interposed piezoelectric insert a is fixedly mounted, by bonding, on a mounting jig between a vibrating body b and a body c at which vibrations are to be prevented. In this method, the vibrations in vertical directions cause a progressive loosening of the body to gradually sacrifice the desired function of the interposed piezoelectric member a. Furthermore, the bond is vulnerable to torsional and lateral forces and can hardly be of practical use. The bolting procedure is also complicated.

To obviate the above disadvantages, it might be contemplated, as shown in FIG. 12B, to support a piezoelectric insert a between a vibrating body b and a vibration insulator c and fasten the three members as a unit by means of a setbolt d. However, the setbolt d would then restrict the expansion and contraction of the interposed piezoelectric insert to reduce the functionality of the piezoelectric insert to a half.

Furthermore, when a resilient member e is interposed between a piezoelectric insert a and a vibrating body b, as shown in FIG. 12C the expansion and contraction of the piezoelectric insert a is not restricted but the elastic deformation of the resilient member e interferes with the effect of the piezoelectric insert.

SUMMARY OF THE INVENTION

The object of the present invention is to provide a vibration isolating system which insures a maximum exploitation of the effect of a member of piezoelectric material, that is to say a piezoelectric insert, and more particularly to a vibration isolating apparatus which insures an improved vibration isolating effect due to an improved mounting arrangement for a piezoelectric insert, is compact and durable, conductive to mass production and easy to assembly.

Intended to accomplish the above object, the present invention is directed to a vibration isolating device to be interposed between a vibration body and a vibrated body, which device is characterized in that at least one of the vibrating body and the vibrated body is fastened to the surface of a vibration isolating device to be abutted against it, with a piezoelectric insert interposed therebetween, by means of a fastener having a predetermined spring constant [K] or a fastener capable of piezoelectric displacement.

The term 'fastener' as used herein means the whole assembly of a setbolt, a resilient member or piezoelectric member, and a nut, including a flat washer in certain instances. The term 'predetermined spring constant [K]' means the spring constant of such fastener assembly as a whole, which does not include a piezoelectric member to be used instead of the resilient member. However, since the members other than said resilient member are rigid bodies, the spring constant of such resilient member is a determinant factor in the predetermined spring constant [K] of the fastener assembly as a whole.

The spring constant [K] can be easily found by means of formula (1) with reference to FIG. 6 which shows the force-displacement relation for a piezoelectric insert at varying voltage.

$$[K] \leq L\max \left( \frac{1}{Dr} - \alpha \frac{1}{D\max} \right) \quad (1)$$

where $\alpha = 1$ if $\gamma \leq 1$ $\alpha = \gamma$ if $\gamma > 1$ $\gamma = \gamma_L / \gamma_D$, $\gamma_L = L_1 / L\max$, $\gamma_D = Dr / D\max$

[K]: The spring constant of a fastener

Lmax: The maximum output force of a piezoelectric insert

Dmax: The maximum displacement of the piezoelectric insert

Dr: The required amount of displacement of the piezoelectric insert $L_1$: The sum of the loading force and fastening force which act on the piezoelectric insert In the vibration apparatus, among those according to the present invention, where the piezoelectric insert is disposed on the surface of a vibration isolating device which is abutted against a vibrating body, a voltage is applied to the piezoelectric insert so as to superimposedly generate oscillations of opposite phase which serve as signals opposed against the vibration due to the vibrating body.

In the vibration isolating system in which a piezoelectric insert is mounted on the surface of a vibration isolating device which is abutted against the vibrated body, a voltage is applied to a piezoelectric insert so as to superimposedly generate vibrations of opposite phase which serve as signals opposed against vibrations transmitted to the vibration isolating device.

In the vibration isolating system in which a piezoelectric insert is mounted on each of the surfaces abutted against the vibration body and vibrated body respectively, the actions described in the preceding paragraphs can be concurrently utilized. Instead, it can be so arranged that the transmitted vibrations are detected by the piezoelectric insert on the vibrated body side and fed back so as to minimize the transmitted vibrations with the piezoelectric insert on the vibrating body side.

The piezoelectric insert is fastened via a resilient washer inserted in a predetermined position. FIG. 5 shows the fastening relation in such an arrangement as a dynamic model.

The vibrations of the vibrating body are offset by the vibrations of the piezoelectric insert. In order to obtain an amplitude necessary for oscillation of this piezoelectric insert, it is necessary that the spring constant of the fastener be within a certain definite range related to characteristics of the piezoelectric insert. The force-displacement relation for the piezoelectric insert, which is a piezoelectric member but is called a 'piezoelectric insert' herein to distinguish it from the piezoelectric member of the fastener, is generally expressed using the applied voltage as a parameter as illustrated in FIG. 6.

To be specific, if a loading force and a fastening force are applied to the piezoelectric insert in the initial state of 0 volt, the insert is displaced to point D. Since the piezoelectric insert subjected to a voltage must expand overcoming the spring constant of the fastener, its action is along the line DF. The maximum amplitude obtained in this condition is Dr (=DE). In other words, when the requirement amount of displacement of the piezoelectric insert, that is to say the amplitude thereof, is Dr, the spring constant of the fastener must not be more than EF/DE. If the spring constant is larger than this value, point F is replaced by point F' in region II, for instance, so that the permissible amount of displacement, i.e. amplitude, of the piezoelectric insert is D'r (=DE') which is short of the required amount of displacement Dr. The above relation is expressed by the formula (1).

In lieu of said resilient member, which is a resilient washer, a fastener capable of piezoelectric displacement, that is a piezoelectric member typically in the form of a washer, can be employed. In this case, the equivalent spring constant can be reduced by vibrating the piezoelectric washer in the reverse phase relative to that of the piezoelectric insert. Moreover, if the piezoelectric washer is vibrated in such reverse phase and with the same amplitude as that of the piezoelectric insert, the equivalent spring constant can be made zero notwithstanding the spring fastening force, thus enabling the piezoelectric insert to fully display its potential performance.

The present invention offers the following effects.

(1) The piezoelectric insert can be easily applied to the existing vibration isolating mount by a simple procedure such as interposing it in the manner of a washer in a predetermined position of the vibration isolating system or installing it in a recess formed in the metal part of the system. This procedure does not require complicated remodeling and offers universality of application.

(2) In the past, whenever a countermeasure against high frequency vibrations in emphasized, deterioration of low-frequency function and reliability of system life were unavoidable. To preclude these adverse results, troublesome structural modifications were essential. However, in accordance with the present invention, such modifications are not required at all but the system performance in the high frequency range, which is particularly poor in the prior art system, can be improved without adverse effects on system performance in the low-frequency region.

(3) The piezoelectric insert is solid, simple in configuration and structure, and can directly vibrate the damping device. Therefore, it is not only tough and durable to insure stability of performance but is universal in applicability for it can be very easily applied to the existing equipment.

(4) The resilient member or piezoelectric washer having a predetermined spring constant is not directly in contact with the piezoelectric insert but is mounted on the surface opposite to the assembled surface and fastened by a bolt. Therefore, the drawback of mounting the piezoelectric insert by bonding is absent and the effect of the piezoelectric insert can be fully exploited without adverse results. Moreover, the spring force of the resilient member or the vibration of the piezoelectric washer absorbs part of the vibrations of the vibrating body and those of the vibrated body to help reduce the required capacity of the piezoelectric insert and hence, the required amount of piezoelectric material, thus contributing to improved economics.

PREFERRED EMBODIMENTS OF THE INVENTION

Figure 1:
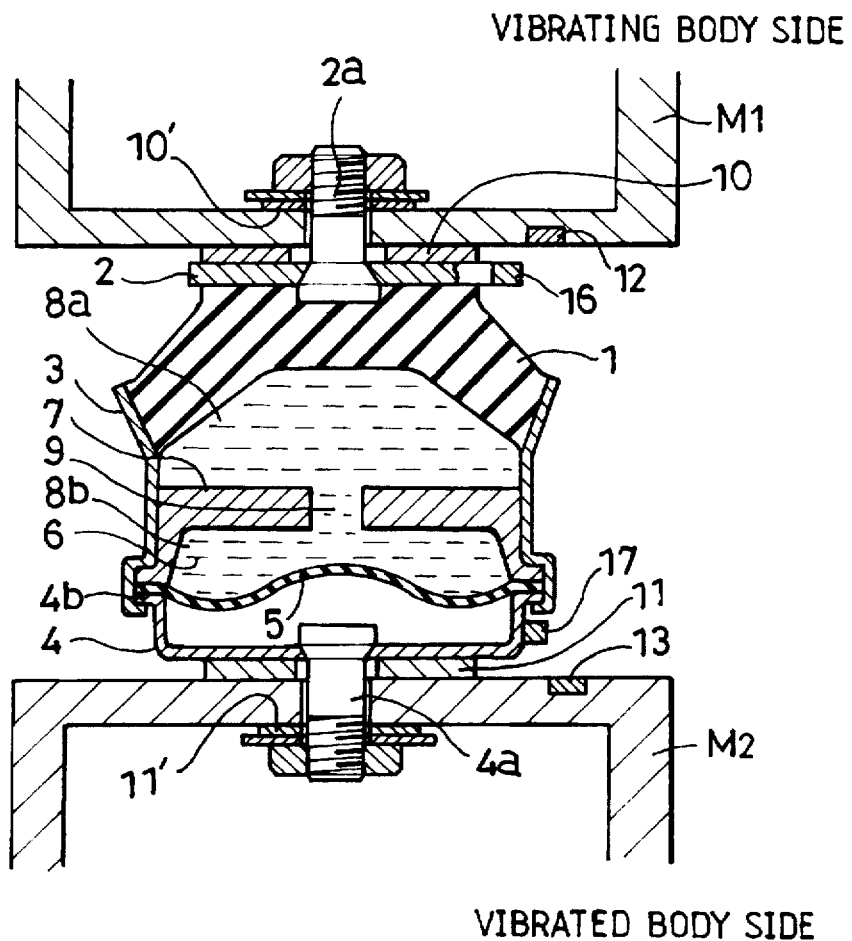
FIGS. 1 through 4 are longitudinal sectional views showing different embodiments of the present invention.

FIG. 1 shows an embodiment in which the present invention is applied to a sealed fluid type engine mount. The reference numeral 1 designates a vibration isolating base which is made of an elastomer, such as rubber, and constitutes a surrounding wall of a first fluid compartment 8a to be described hereinafter. Fixedly mounted on the vibration isolating base 1 is a mounting metal 2 carrying a setbolt 2a. By means of this setbolt 2a, the damping base 1 is attached to a mounting frame $M_1$ of a vibrating body which is to be supported thereby, such as a car engine. An outer metal jacket 3 extending down in the form of a cylinder from the vibration isolating base 1 is secured to the tapered lower periphery of the vibration isolating base 1.

The reference numeral 4 indicates a receiving metal having a concave section which carries a setbolt 4a for attachment to a car chassis, frame or the like. This receiving metal 4 has an open end 4b engaging the lower end of said jacket 3 and setting it fixedly with the aid of an appropriate fastening means, for example by caulking. The lower opening of said jacket 3 is closed by a membrane 5 made of a flexible material. A sealed internal chamber defined by the member 5 and vibration isolating base 1 is filled with a fluid 6. This internal chamber is partitioned by an intermediate plate 7 into a first fluid compartment 8a and a second fluid compartment 8b. The intermediate plate 7 of fitted against the inner circumferential wall is the jacket 3. The outer peripheral edge of the intermediate plate 7 and the peripheral edge of the membrane 5 are clamped between the receiving metal 4 and jacket 3, whereby the two fluid compartments 8a and 8b are maintained in sealed condition. The intermediate plate 7 is centrally provided with an orifice 9 through which the fluid 6 may flow between the two fluid compartments 8a and 8b.

In the above system, the vibration isolating base 1, metal jacket 3 and receiving metal 4 constitute a vibration isolating device. Such an isolating device is installed for each of mounting frames $M_1$ and $M_2$ disposed on the vibrating body side and the vibrated body side, respectively.

The present invention is characterized in that a first and a second piezoelectric insert 10, 11 are built into the system in predetermined positions. Each of said piezoelectric inserts 10 and 11 is a plate having an appropriate thickness and the shape of a washer. The piezoelectric insert 10 is abutted against the surface of the mounting metal 2 which lies adjacent to the mounting frame $M_1$. The piezoelectric insert 11 is abutted against the surface of the receiving metal 4 which lies adjacent to the mounting frame $M_2$ for the vibrated body. The washer-shaped piezoelectric inserts 10, 11 are such that setbolts 2a and 4a can be respectively loosely fitted through. The piezoelectric inserts 10, 11 are sandwiched between the external surfaces of mounting metals $M_1$, $M_2$ and the corresponding metals 2, 4, respectively. The setbolts 2a, 4a respectively extend through the corresponding mounting metals $M_1$, $M_2$, piezoelectric inserts 10, 11 and metals 2, 4. The setbolts 2a, 4a are respectively fastened by the corresponding nuts through resilient members 10', 11', each having a predetermined spring constant, on the sides of the mounting frames $M_1$, $M_2$ contacting the piezoelectric inserts 10, 11.

Strictly speaking, the spring constant [K] of formula (1) is not the spring constant of said resilient member 10' or 11' only but that of the whole fastener assembly inclusive of the setbolt 2a or 4a, nut and flat washer as well.

Figure 2:
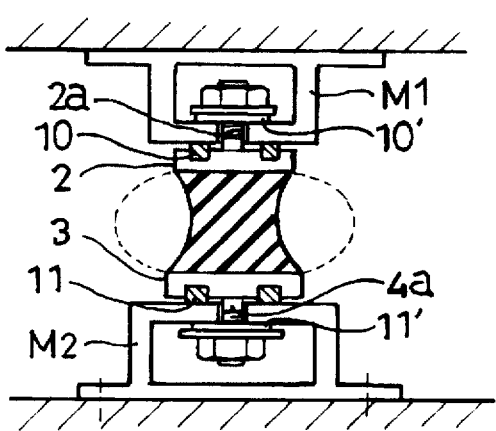

The piezoelectric insert 10, 11 is not limited to a washer-shaped member but may be block-shaped, coin-shaped or otherwise configured. In FIG. 1, the piezoelectric inserts 10 and 11 are abutted against the mounting metal 2 adjacent to the vibrating body and the receiving metal 5 adjacent to the vibrated body. Instead, as shown in FIG. 2, the piezoelectric inserts 10, 11 may be partially embedded in the mounting metal 2 and receiving metal 3, respectively. Furthermore, the piezoelectric inserts 10, 11 may be embedded in the mounting frames $M_1$ and $M_2$, respectively, in the manner illustrated in FIG. 7 and FIG. 8A (the mounting metal of FIG. 8A as seen from the vibration isolating device side).

Figure 3:
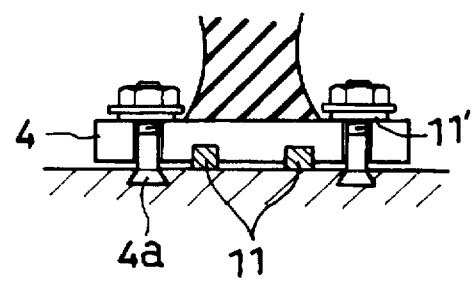

The mounting position of setbolt 2a or 4a is the center of the mounting metal 2 or receiving metal 4 in FIG. 1. Instead, the mounting metal 2 and the receiving metal 4 may be extended and the setbolts be fastened at both ends. FIG. 3 shows the case in which the setbolt 4a is fitted at either end of the receiving metal 4. In either case, it is necessary that the fastening be done through a resilient member 10', 11', having a predetermined constant, on the surface opposite to the surface of assembling with the piezoelectric insert 10, 11.

The vibration isolating device according to FIG. 1 is a sealed fluid type device, while the vibration isolating device shown in FIG. 2 utilizes the resiliency of a rubber element. Though not illustrated, a vibration isolating device utilizing the elasticity of air or any other optional vibration isolating device can be employed.

The piezoelectric insert 10, 11 is constituted by a piezoelectric ceramic material such as PZT or a piezoelectric high polymer such as PVDF. Depending on necessity, both or either one of the illustrated piezoelectric inserts 10, 11 can be employed.

The resilient member used to fasten the setbolt may most commonly be a resilient washer such as a rubber washer, a spring washer or the like. In the case of a resilient washer, its spring constant is an important consideration. The method of determing this constant is now explained with reference to FIGS. 7, 8A and 9.

Figure 7:
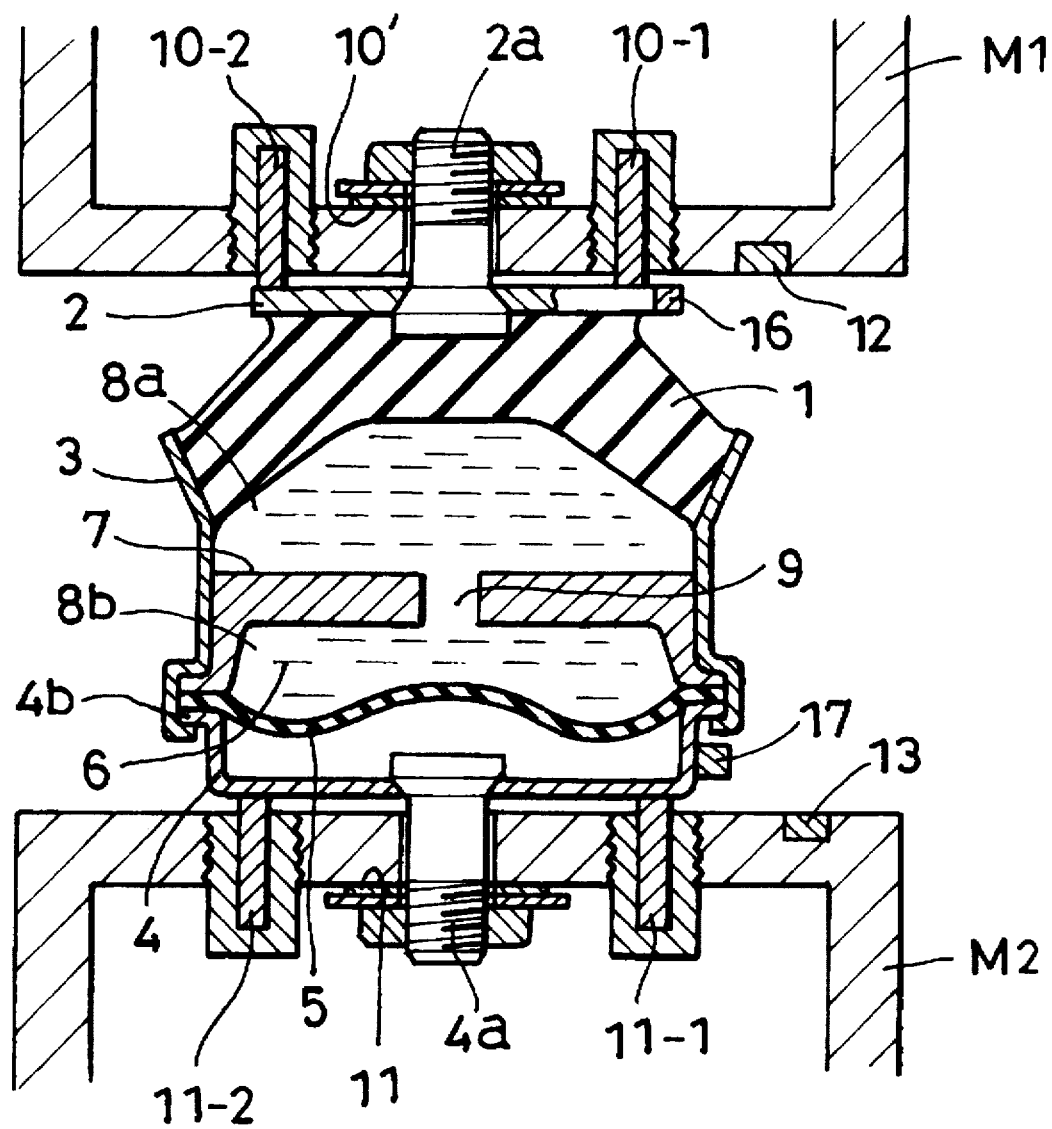
FIG. 7 is a longitudinal section view showing another embodiment of the present invention.
Figure 8A:
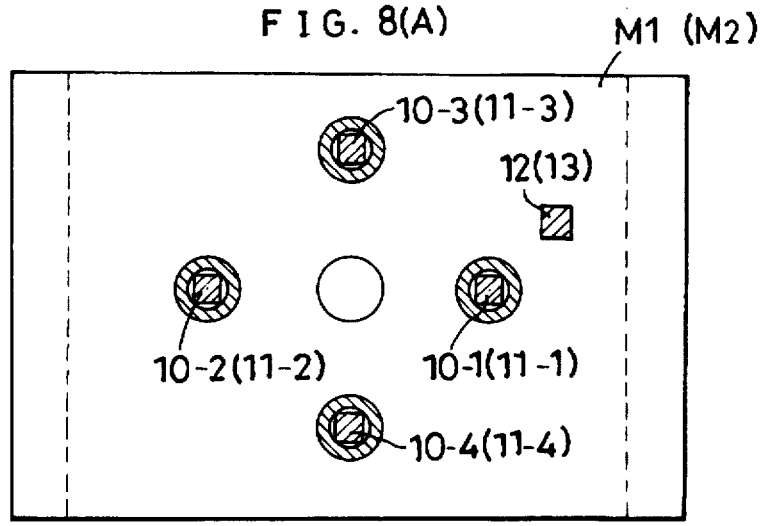
FIGS. 8A is a plan view of the same embodiment.

As piezoelectric inserts, which are piezoelectric members, four AE0505D16 (5×5×20 mm) elements, manufactured by NEC Corporation, are used per set and arranged as designated by reference numerals 10-1, 10-2, 10-3 and 10-4 in FIGS. 7 and 8A.

Figure 9:
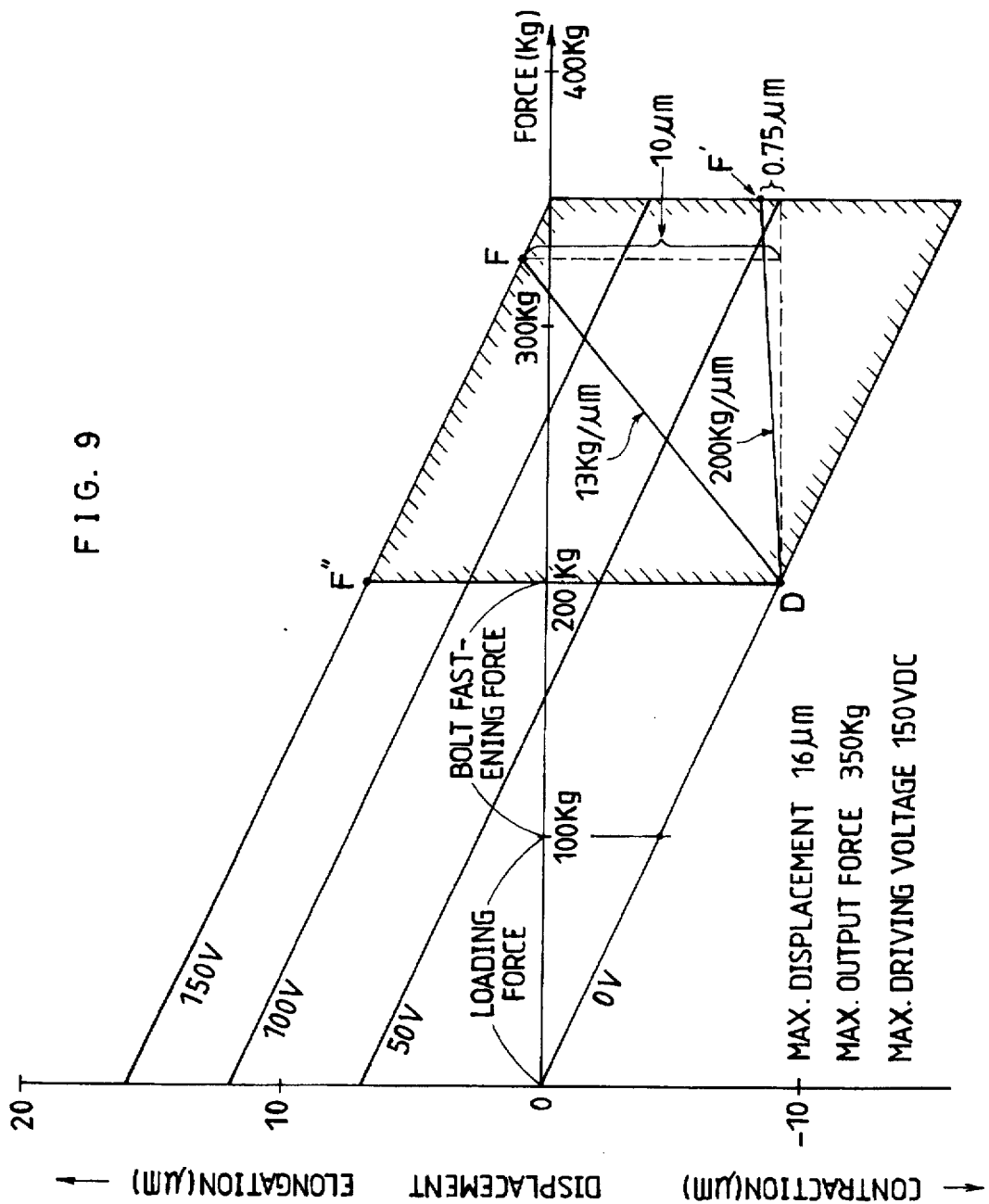
FIG. 9 and FIG. 9A are diagrammatic representations corresponding to the diagrams of FIGS. 6 and 5 respectively in which factual values are substituted.
Figure 9A:
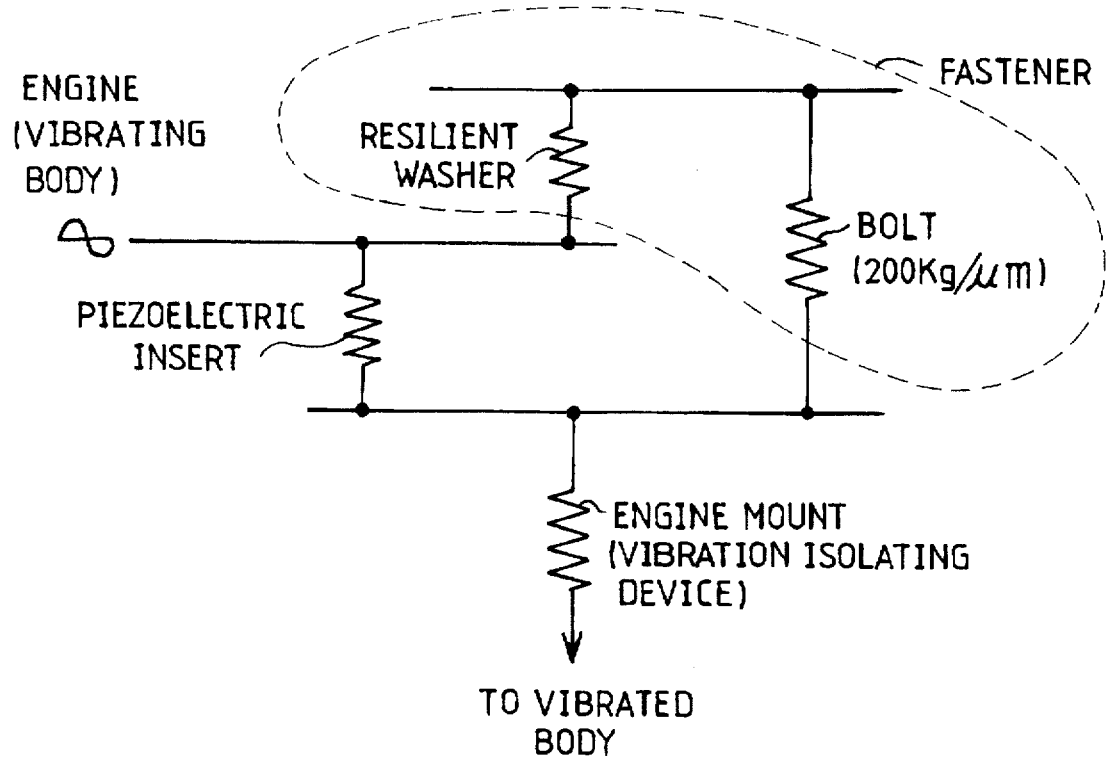
Figure 10A:
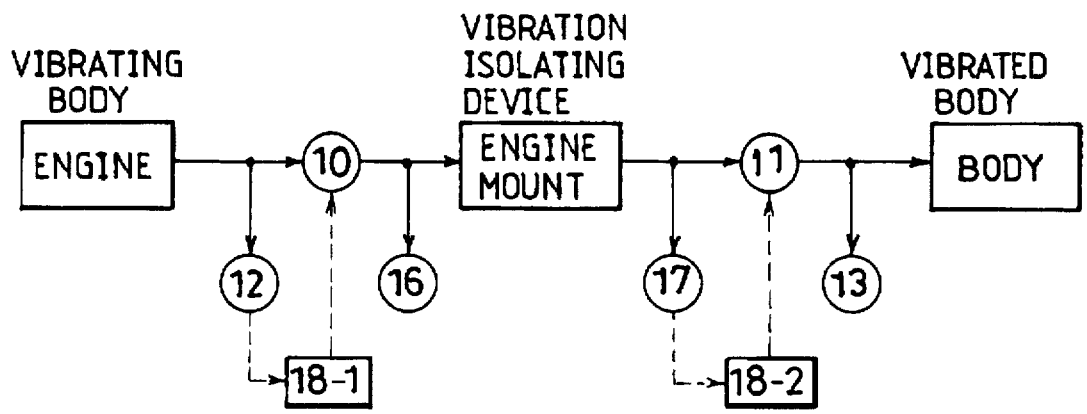
FIGS. 10A through FIG. 10F, FIG. 11A and FIG. 11B are diagrams showing the control systems for the piezoelectric insert and the piezoelectric washer which is a fastener capable of undergoing piezoelectric displacement in accordance with the present invention.
Figure 10B:
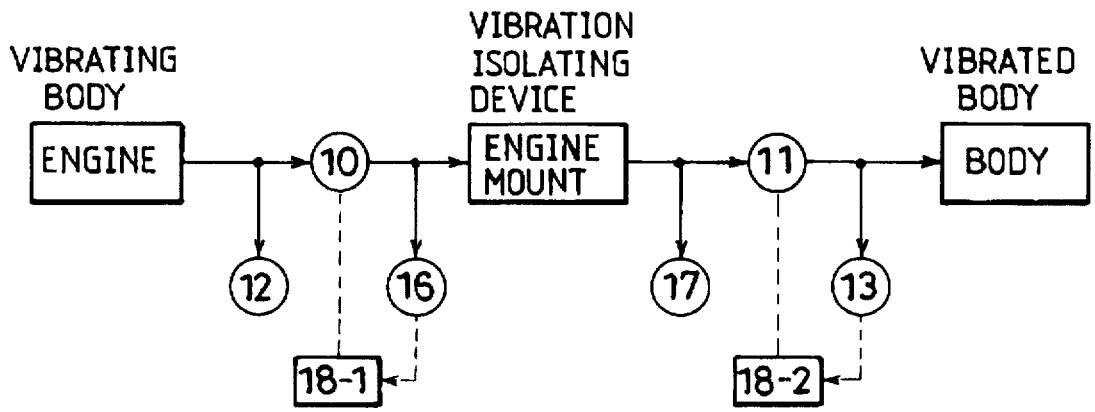
Figure 10C:
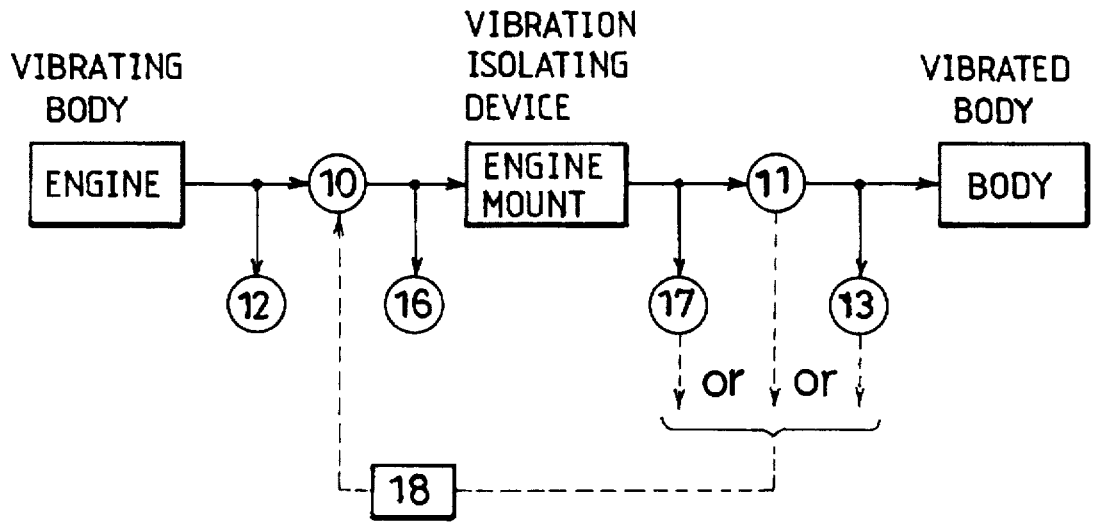
Figure 10D:
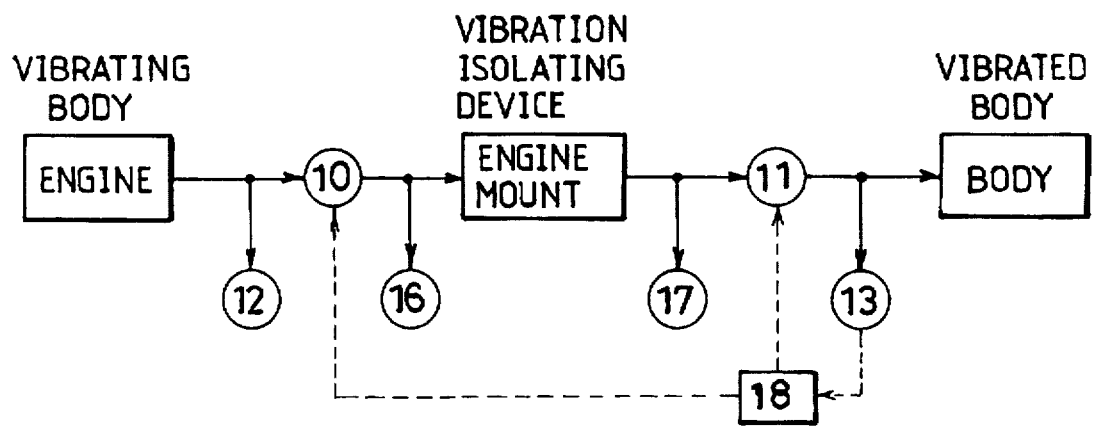
Figure 10E:
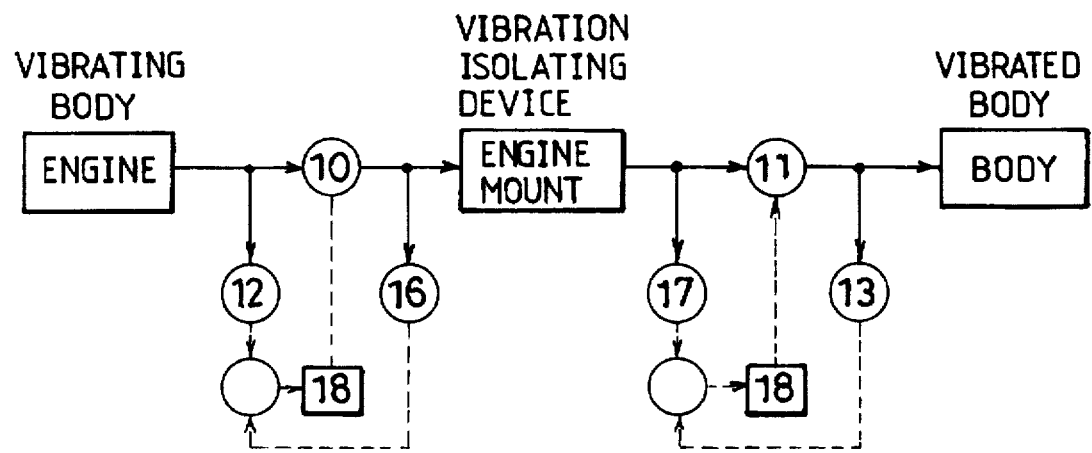
Figure 10F:
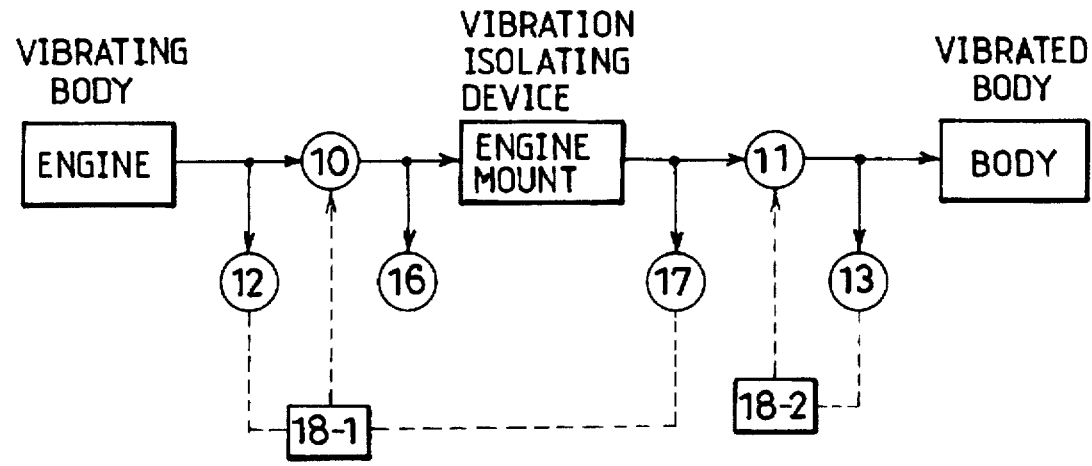

FIG. 9 shows the force-displacement relation for the piezoelectric insert consisting of said 4 elements per set with applied voltage as a parameter, and the maximum rating value, and FIG. 9A shows a dynamic model of the fastened part.

It is assumed that as the engine load or the loading force, 100 kg is applied to the engine mount or the damping device and that a fastening force of 100 kg due to the bolt is applied for fastening. Then, the piezoelectric insert is subjected to a compression force of 200 kg. Assuming that the applied voltage in this condition is 0 volt, the piezoelectric insert is compressed by 9 μm and displaced to point D.

It is assumed that the vibrations transmitted from the engine to the vibration isolating device has a frequency of 5,000 Hz and an amplitude of ±5 μm or a maximum amplitude of 10 μm. This is a vibration with an acceleration of 5 G. The vibration isolation of such vibrations is described below.

Figure 12A:
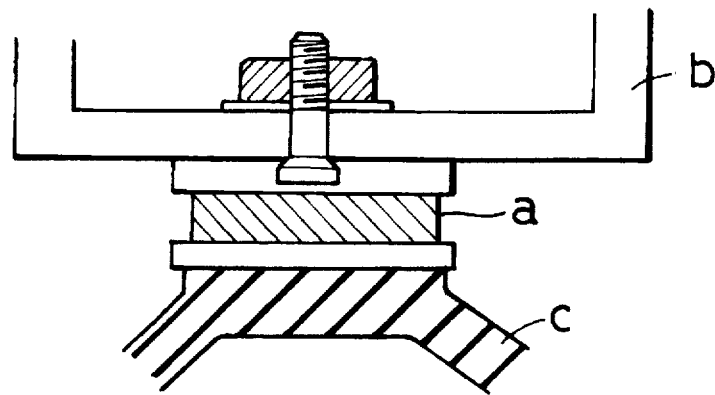
FIG. 12A, FIG. 12B and FIG. 12C are diagrammatic views showing the manner of fastening of a piezoelectric actuator in the prior art damping device.
Figure 12B:
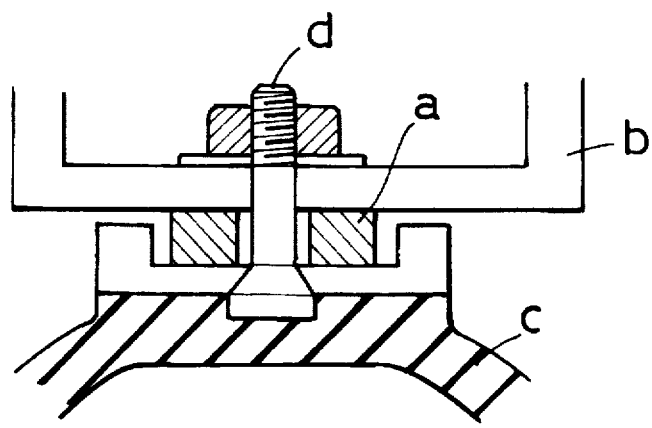
Figure 12C:
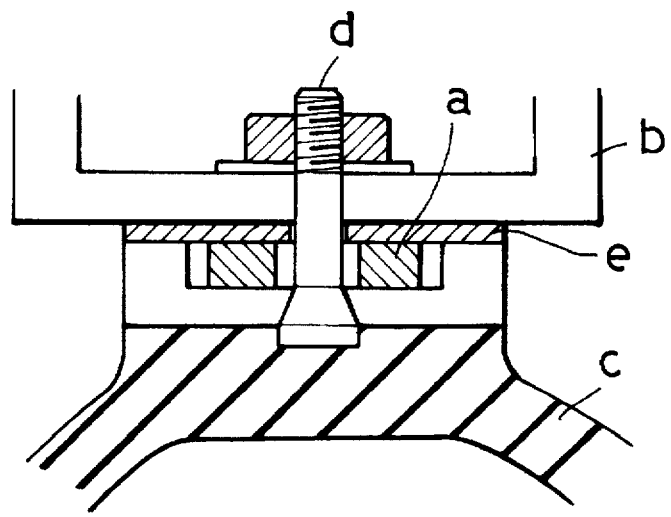

In order to prevent transmission of the vibration, theoretially the piezoelectric insert should be oscillated in the reverse phase relative to said vibration and in the same amplitude as that of the vibration. However, where the conventional bolt fastening is carried out without use of a resilient washer as shown in FIG. 12B, because the spring constant of the bolt is about 200 kg/μm, it happens, as shown in FIG. 9, that even if it is attempted to oscillate the piezoelectric insert by application of a voltage, it is merely moved on the line DF' to give only an amplitude of 0.75 μm, thus failing to achieve the desired damping effect. It is apparent from FIG. 9 that in order to obtain the required amplitude of 10 μm in this case, it is necessary to employ a resilient washer having a spring constant not exceeding 13 kg/μm. For example, this object can be accomplished by using an elastic washer of rubber with an area of 5 cm² and a thickness of 1 mm.

Figure 4:
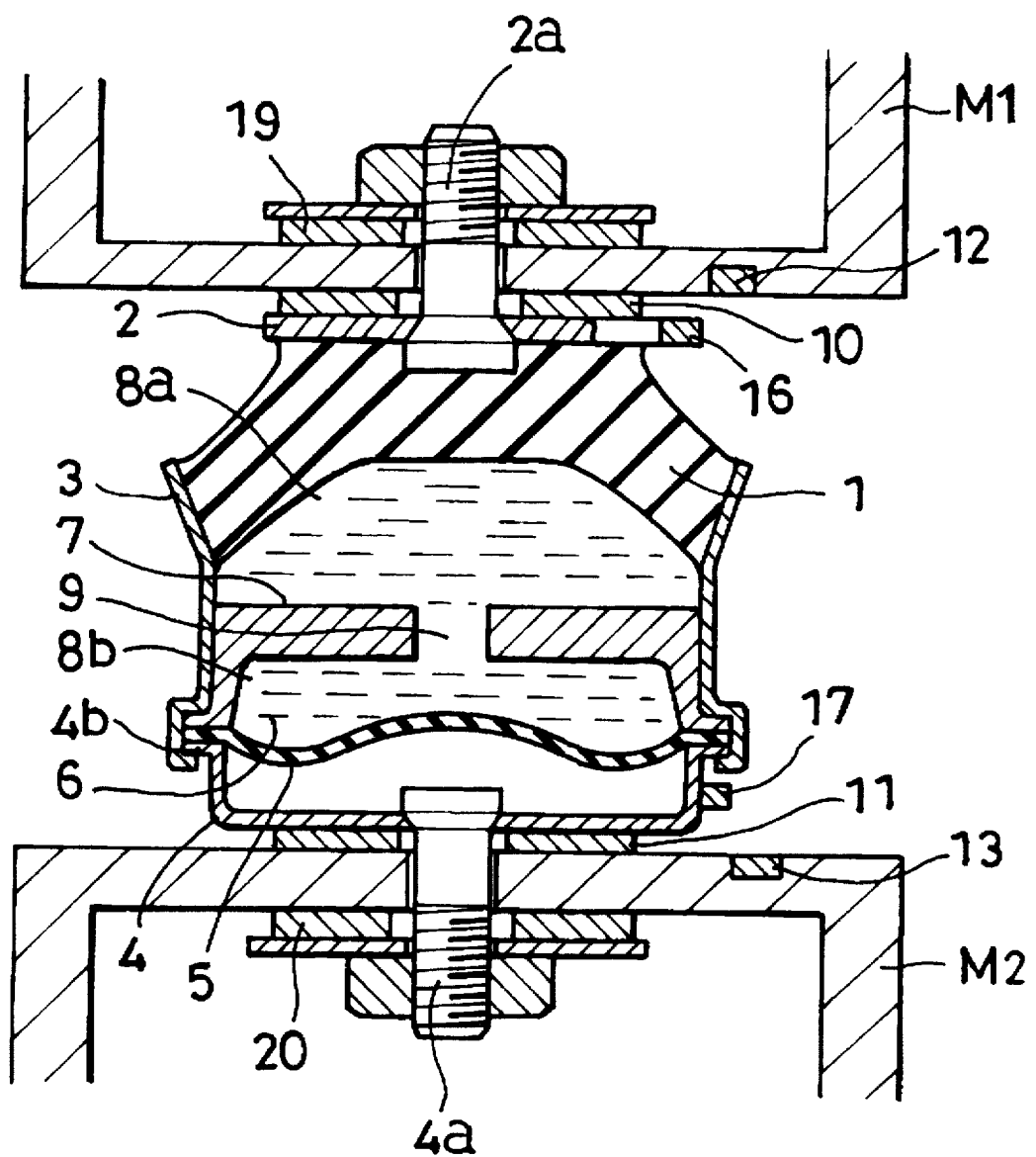
Figure 5:
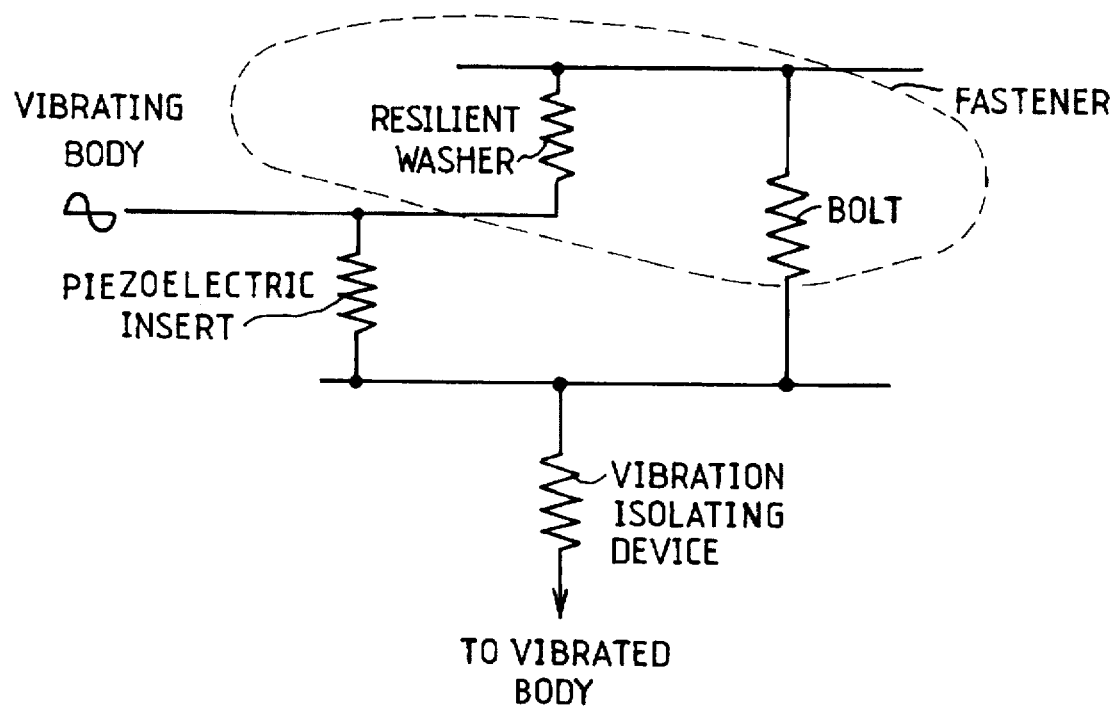
FIGS. 5 and 6 are diagrams each showing the force-displacement relation for determination of the spring constant in accordance with the present invention.
Figure 6:
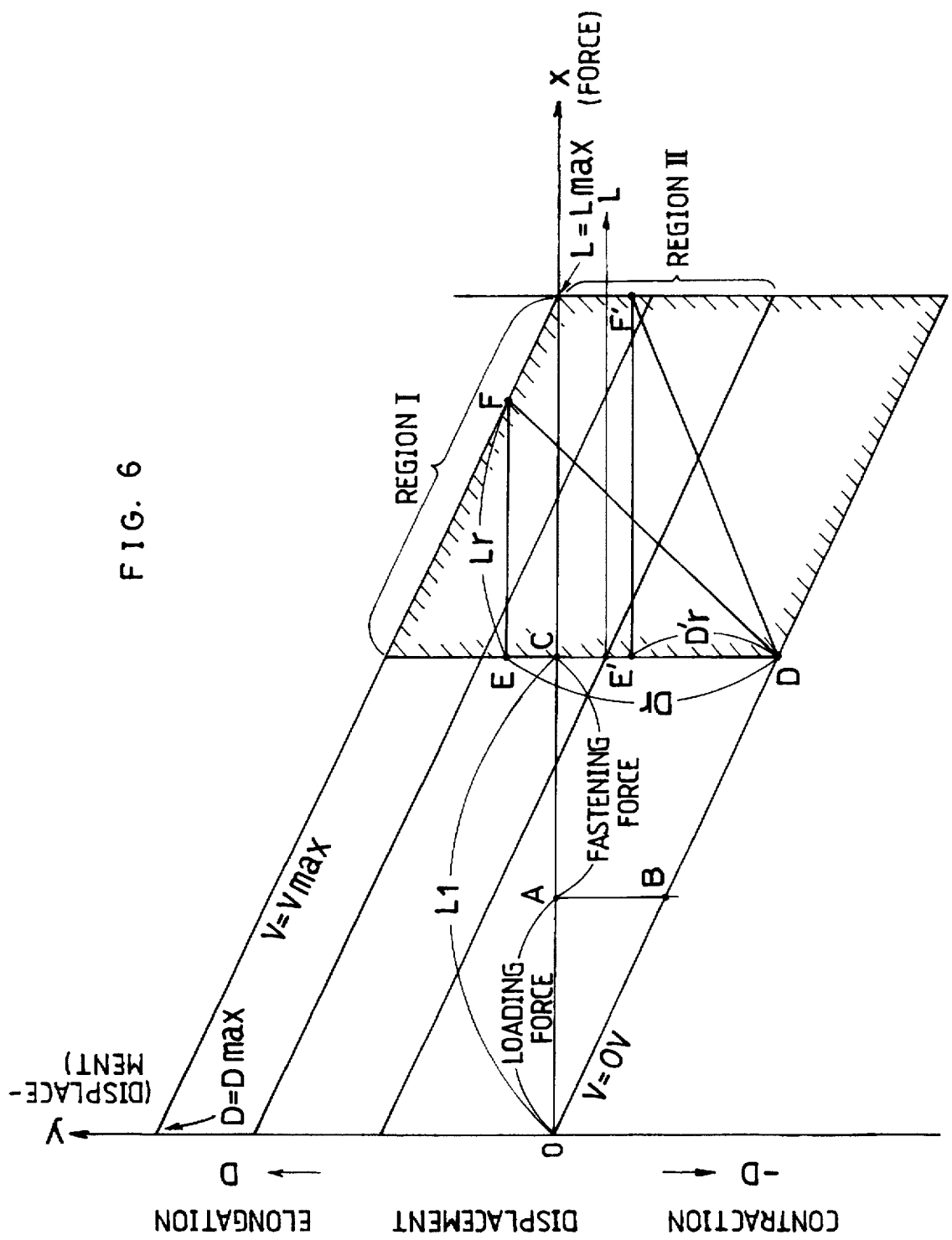
Figure 8B:
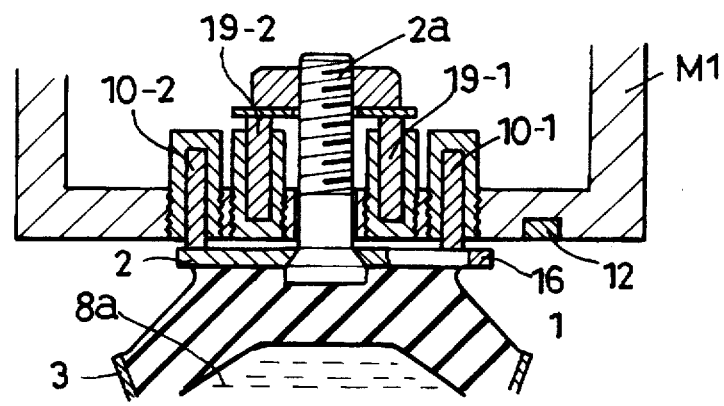
FIG. 8B is a longitudinal section view showing the cardinal part of still another embodiment of the present invention.
Figure 8C:
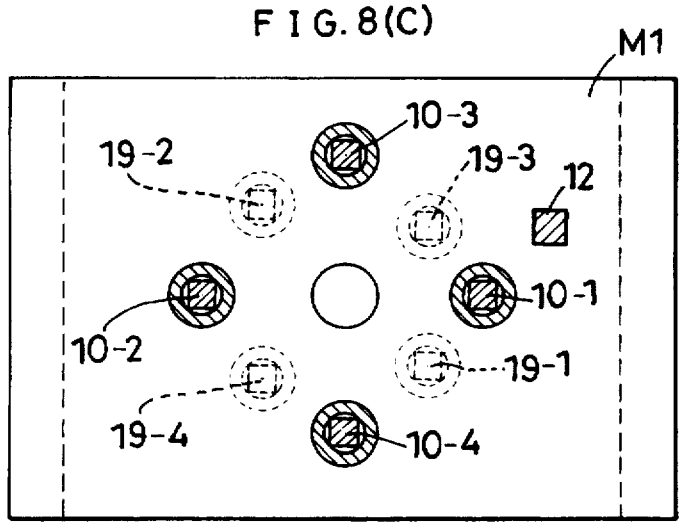
FIG. 8C is a plan view of the same embodiment.

In lieu of the resilient washers 10', 11' shown in FIGS. 1 through 3 and 5, piezoelectric washers 19, 20 which undergo piezoelectric displacement can be employed as shown in FIG. 4. As such piezoelectric washers, those which vibrate in the reverse phase and with the same amplitude as that of the piezoelectric elements 10-1, 10-2, 10-3 and 10-4 are employed as shown in FIGS. 8B and 8C. In this case, as apparent from FIG. 9, the action of the piezoelectric insert occurs on the line DF". This corresponds to a spring constant of 0 kg/μm. This is a spring constant not exceeding 13 kg/μm. It is, therefore, possible to obtain the required amplitude of 10 μm and cause it to oscillate to the maximum displacement of 16 μm.

Figure 11A:
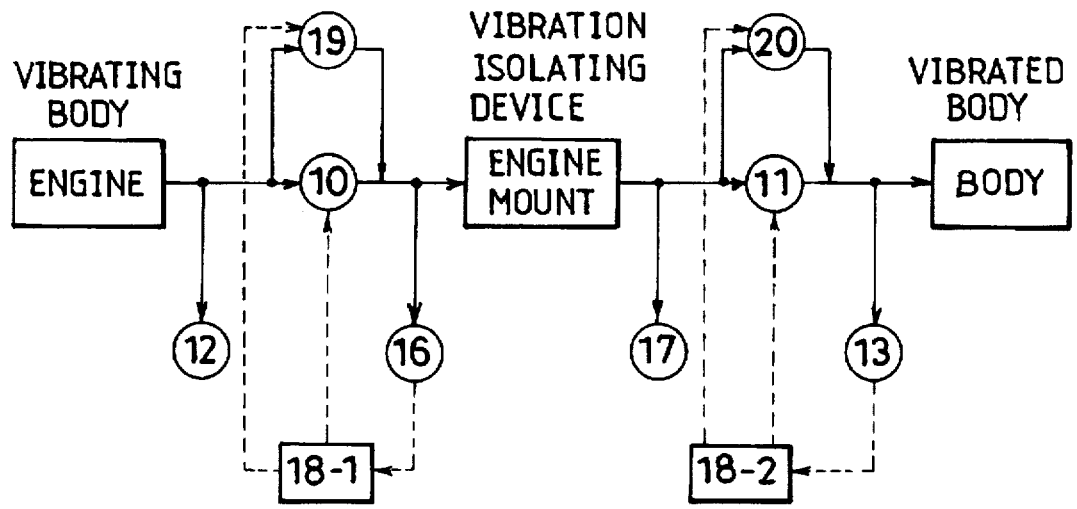
Figure 11B:
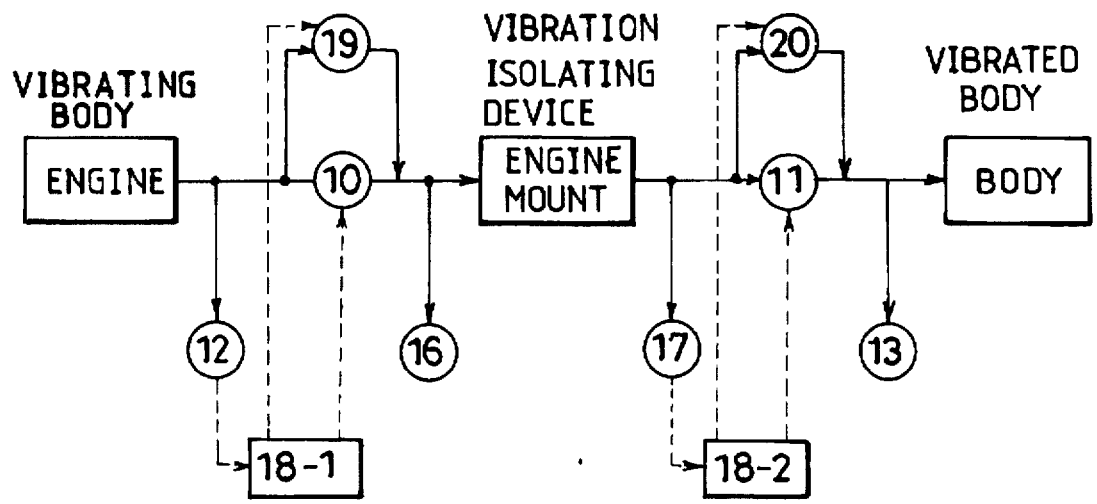

FIGS. 10A through 10F show various examples of the control block diagram used for the vibration damping system shown in FIGS. 1 and 7. FIGS. 11A and 11B show examples of the control block diagram used for the vibration damping system shown in FIGS. 4 and 8B. In the views, the solid lines represent the vibration system and the dotted lines represent the signal system. The reference numerals 10, 11 designate the piezoelectric inserts, 12, 13, 16 or 17 designates a displacement, force or other sensor, and 18 designates an adjuster for amplitude, phase, bias and so on. These devices are all based on the feed-forward or feed-back principle well known in the art.

In FIGS. 11A and 11B a controller 18-1 supply opposite signals to a piezoelectric insert 10 and a piezoelectric washer 19. For example when a plus signal is provided to the insert 10, a minus signal is provided to the washer 19. In the same manner a controller 18-2 supply signals to an insert 11 and a washer 20. By doing so, vibration of the piezoelectric washer in the reverse phase relative to that of the piezoelectric insert can be obtained.

What is claimed:

1. A vibration isolating apparatus to be interposed between a vibrating body and a vibrated body, comprising:

a vibration isolating device;

a piezoelectric insert;

said piezoelectric insert being interposed between and in substantially inelastic engagement with said vibration isolating device and at least one of the vibrating body and the vibrated body;

a fastener means for coupling together said vibration isolating device and said at least one of the vibrating body and the vibrated body, said fastener means having a spring constant K;

said fastener means including a resilient member to effect an elastic coupling of said vibration isolating device and said at least one of the vibrating body and the vibrated body, said resilient member being disposed outside a path of engagement of said piezoelectric insert with said vibration isolating device and said at least one of the vibrating body and the vibrated body, said spring constant K being represented by the following formula:

$$K \leq L\max \left( \frac{1}{Dr} - \alpha \frac{1}{D\max} \right)$$

where:

$\alpha=1$ if $\gamma \leq 1$, $\alpha=\gamma$ if $\gamma > 1$, $\gamma = \gamma_L/\gamma_D$, $\gamma_L = L_1/L\max$, $\gamma_D = Dr/D\max$,

[K]: the spring constant of a fastener means,

Lmax: a maximum output force of the piezoelectric insert,

Dmax: a maximum displacement of the piezoelectric insert,

Dr: a required amount of displacement of the piezoelectric insert, $L_1$: a sum of a loading force and a fastening force which act on the piezoelectric insert; and said piezoelectric insert expanding and contracting to effect a size displacement of said piezoelectric insert equal to said required amount of displacement of the piezoelectric insert Dr which in turn effects a displacement of said vibration isolating device relative to said at least one of the vibrating body and the vibrated body equal to said required amount of displacement of the piezoelectric insert Dr.

2. A vibration isolating apparatus of claim 1 wherein the spring constant of said resilient member is a determinant factor in said spring constant [K] of the fastener means as a whole.

3. A vibration isolating apparatus to be interposed between a first mounting frame on a vibrating body and a second mounting frame on a vibrated body, comprising:

a vibration isolating device;

a piezoelectric insert;

said piezoelectric insert being interposed between and in substantially inelastic engagement with said vibration isolating device and at least one of said first mounting frame and said second mounting frame;

a resilient member disposed on a side of said at least one of said first mounting frame and said second mounting frame which is opposite a side facing said piezoelectric insert;

said vibration isolating device, said piezoelectric insert, said at least one of said first mounting frame and said second mounting frame, and said resilient member being fastened with a setbolt and a nut, said setbolt and nut together with said resilient member constituting a fastener means having a spring constant K which is represented by the following formula:

$$K \leq L\max \left( \frac{1}{Dr} - \alpha \frac{1}{D\max} \right)$$

where:

$\alpha=1$ if $\gamma \leq 1$, $\alpha=\gamma$ if $\gamma > 1$, $\gamma = \gamma_L/\gamma_D$, $\gamma_L = L_1/L\max$, $\gamma_D = Dr/D\max$, K: the spring constant of the fastener means, Lmax: a maximum output force of the piezoelectric insert, Dmax: a maximum displacement of the piezoelectric insert, Dr: a required amount of displacement of the piezoelectric insert, $L_1$: a sum of a loading force and a fastening force which act on the piezoelectric insert; and said piezoelectric insert expanding and contracting to effect a size displacement of said piezoelectric insert equal to said required amount of displacement of the piezoelectric insert Dr which in turn effects a displacement of said vibration isolating device relative to said at least one of the vibrating body and the vibrated body equal to said required amount of displacement of the piezoelectric insert Dr.

4. A vibration isolating apparatus to be interposed between a first mounting frame on a vibrating body and a second mounting frame on a vibrated body, comprising:

a piezoelectric insert;

said piezoelectric insert being interposed between and in substantially inelastic engagement with said vibration isolating device and at least one of said first mounting frame and the second mounting frame;

a piezoelectric member, capable of piezoelectric displacement, disposed on a side of said at least one of said first mounting frame and said second mounting frame which is opposite a side of said at least one of said first mounting frame and said second mounting frame facing said piezoelectric insert;

said vibration isolating device, said piezoelectric insert, said at least one of said first mounting frame and second mounting frame, and said piezoelectric member being fastened with a setbolt and a nut; and said piezoelectric insert expanding and contracting in conjunction with said piezoelectric member contracting and expanding, respectively, to effect a size displacement of said piezoelectric insert equal to a required amount of displacement of the piezoelectric insert which in turn effects a displacement of said vibration isolating device relative to said at least one of the vibrating body and the vibrated body equal to said required amount of displacement of the piezoelectric insert.

5. A vibration isolating apparatus comprising:

a damping device capable of piezoelectric displacement, said damping device being disposed between a vibrating body and a vibrated body;

a piezoelectric insert capable of piezoelectric displacement;

fastening means for fastening at least one of the vibrating body and the vibrated body to a surface of said damping device said piezoelectric insert interposed therebetween;

said fastening means including a resilient member to effect an elastic coupling of said damping device and said at least one of the vibrating body and the vibrated body, said resilient member being disposed outside a path of engagement of said piezoelectric insert with said damping device and said at least one of the vibrating body and the vibrated body;

said fastening means having a spring constant which is represented by the following formula:

$$K \leq L\max \left( \frac{1}{Dr} - \alpha \frac{1}{D\max} \right)$$

where:

$\alpha = 1$ if $\gamma \leq 1$, $\alpha = \gamma$ if $\gamma > 1$, $\gamma = \gamma_L / \gamma_D$, $\gamma_L = L_1 / L\max$, $\gamma_D = Dr / D\max$, K: the spring constant of the fastener means, Lmax: a maximum output force of the piezoelectric insert, Dmax: a maximum displacement of the piezoelectric insert, Dr: a required amount of displacement of the piezoelectric insert, $L_1$: a sum of a loading force and a fastening force which act on the piezoelectric insert; and said piezoelectric insert expanding and contracting to effect a size displacement of said piezoelectric insert equal to said required amount of displacement of the piezoelectric insert Dr which in turn effects a displacement of said vibration isolating device relative to said at least one of the vibrating body and the vibrated body equal to said required amount of displacement of the piezoelectric insert Dr.

6. The vibration isolating apparatus of claim 5, further comprising means for mounting on at least one of the vibrating body and the vibrated body, said damping device being fastened to said mounting means by said fastening means, said piezoelectric insert being disposed between said damping device and said mounting means, and said resilient member being disposed on a side of said mounting means opposite said piezoelectric insert.

7. The vibration isolating apparatus of claim 5, wherein said resilient member is a piezoelectric member capable of piezoelectric displacement.

8. The vibration isolating apparatus of claim 7, wherein said piezoelectric insert is vibrated in a phase opposite to the vibrating body and said piezoelectric member is vibrated in a phase opposite to said piezoelectric insert.

9. A vibration isolating apparatus comprising:

a damping device incapable of piezoelectric displacement, said damping device being disposed between a vibrating body and vibrated body;

a piezoelectric insert capable of piezoelectric displacement;

fastening means for fastening at least one of the vibrating body and the vibrated body to a surface of said damping device with said piezoelectric insert interposed therebetween;

said fastening means including a resilient member, to effect an elastic coupling of said damping device and said at least one of the vibrating body and the vibrated body, said resilient member being disposed outside a path of engagement of said piezoelectric insert with said damping device and said at least one of the vibrating body and the vibrated body; and said piezoelectric insert expanding and contracting to effect a size displacement of said piezoelectric insert equal to a required amount of displacement of the piezoelectric insert which in turn effects a displacement of said damping device relative to said at least one of the vibrating body and the vibrated body equal to said required amount of displacement of the piezoelectric insert.

10. A vibration isolating apparatus comprising:

a damping device incapable of piezoelectric displacement, said damping device being disposed between a vibrating body and vibrated body;

a piezoelectric insert capable of piezoelectric displacement;

fastening means for fastening at least one of the vibrating body and the vibrated body to a surface of said damping device with said piezoelectric insert interposed therebetween;

said fastening means including a piezoelectric member to effect an active coupling of said damping device and said at least one of the vibrating body and the vibrated body, said piezoelectric member being disposed outside a path of engagement of said piezoelectric insert with said damping device and said at least one of the vibrating body and the vibrated body; and said piezoelectric insert expanding and contracting in conjunction with said piezoelectric member contracting and expanding, respectively, to effect a size displacement of said piezoelectric insert equal to a required amount of displacement of the piezoelectric insert which in turn effects a displacement of said damping device relative to said at least one of the vibrating body and the vibrated body equal to said required amount of displacement of the piezoelectric insert.

* * * * *